Aug. 14, 1962  L. A. MARX  3,049,363
TRUCK DRIVER PROTECTION SHIELD
Filed March 28, 1960
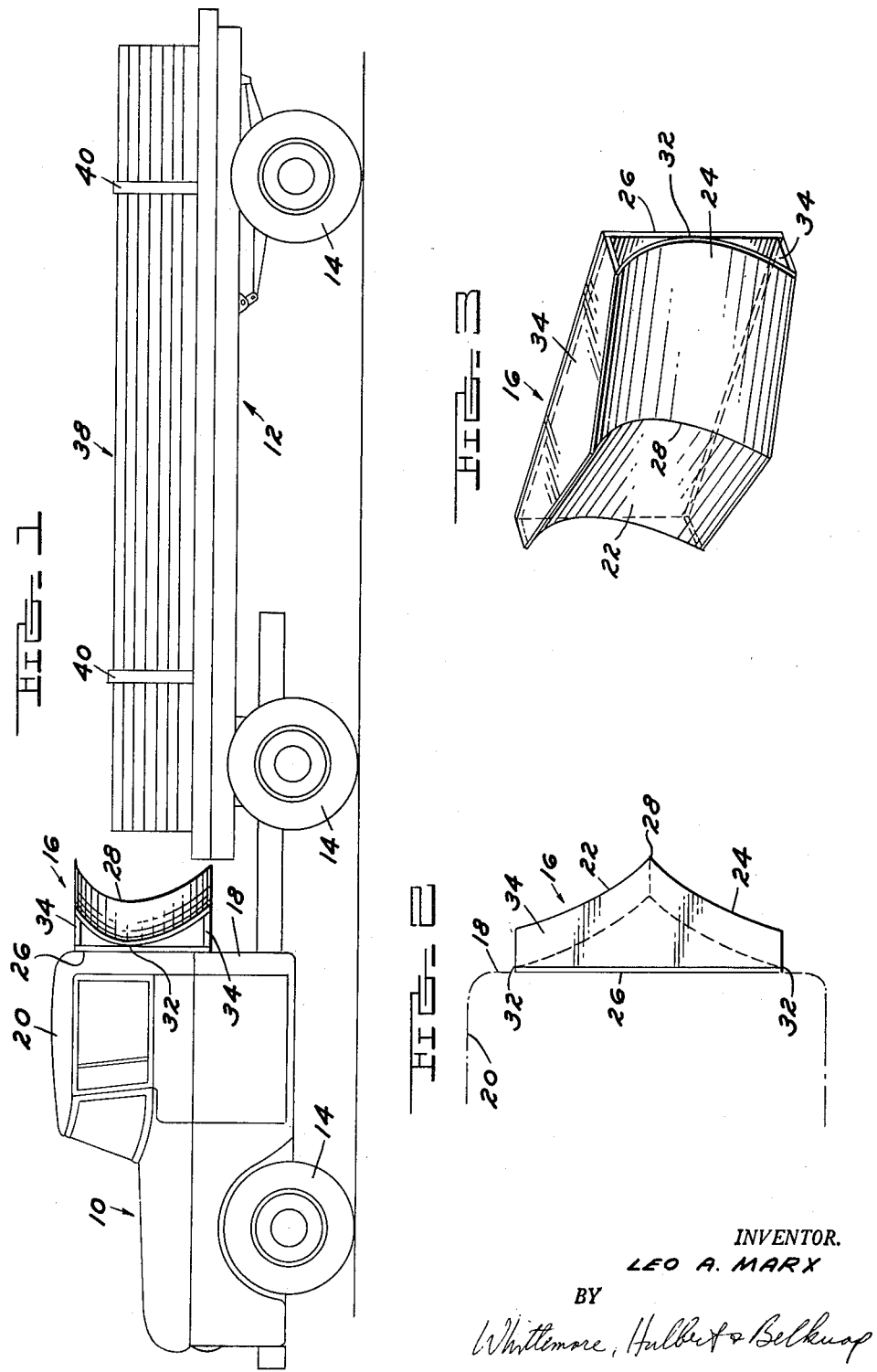
INVENTOR.
LEO A. MARX
BY
Whittemore, Hulbert & Belknap
ATTORNEYS United States Patent Office 3,049,363
Patented Aug. 14, 1962

3,049,363
TRUCK DRIVER PROTECTION SHIELD
Leo A. Marx, 3200 Van Alstyne, Wyandotte, Mich.
Filed Mar. 28, 1960, Ser. No. 18,153
7 Claims. (Cl. 280—150)

This invention relates generally to shields and refers more particularly to a truck driver's protection shield.

One object of this invention is to provide a driver's protection shield for a truck or like vehicle adapted to be mounted between the driver's compartment and the load carrying part of the vehicle behind the driver's compartment to protect the driver against the hazard of a forward shift in the load.

Any form of flat transverse abutment for this purpose is of little value in protecting the driver particularly where the load is comprised of a heavy material such as pipe which, when it starts to move forward, has tremendous momentum.

It is therefore a further object of the invention to provide a shield of generally V-shaped configuration having a central rear edge defining the apex of the V and deflecting surfaces flared laterally outwardly from the rear edge in a forward direction to deflect any material that may move forward with respect to the vehicle as, for example, when the vehicle is stopped suddenly.

Another object of the invention is to provide a shield which is inexpensive to manufacture yet well suited for the accomplishment of its intended function.

Other objects and features of the invention will become apparent as the description proceeds, especially when taken in conjunction with the accompanying drawing, wherein:

FIGURE 1 is a side elevational view of a load carrying vehicle with the shield of my invention mounted thereon.

FIGURE 2 is a top plan view of the shield with portions of the vehicle shown in phantom lines.

FIGURE 3 is a rear perspective view of the shield.

Referring now more particularly to the drawing, the truck shown in FIGURE 1 is composed of a tractor 10 and a trailer 12, each having ground engaging wheels 14 and connected together in conventional fashion. The driver's protection shield is indicated generally by the reference character 16 and is shown rigidly mounted on the rear wall 18 of the cab 20 forming the driver's compartment.

The shield 16 comprises the deflector plates 22 and 24 and the front mounting plate 26. The plates 22, 24 and 26 are formed of sheet metal, such as steel for example. The deflector plates 22 and 24 meet in a central rear edge 28 and flare laterally outwardly from the rear edge in a forward direction. The rear edge 28 is disposed in a vertical plane. The plates 22 and 24 are generally upright although all vertical sections thereof are concavo-convex with the concave side facing to the rear. All horizontal sections of the plates 22 and 24 are generally in the form of a V with the apex of the V at the rear edge 28. While, as stated, the horizontal sections are generally V-shaped, each leg of the V defined by the individual plates 22 and 24 is somewhat concavo-convex as seen in FIGURE 2.

The rearwardly facing surfaces of the deflector plates 22 and 24 provide the deflecting surfaces which meet along the central rear edge 28, flare outwardly in a forward direction with horizontal sections thereof and all vertical sections thereof being concave. In other words, the general shape and configuration of these surfaces are identical with that of the plates 22 and 24 of which they are a part, described above.

The mounting plate 26 is flat and engages the laterally outer edges of the plates 22 and 24 at a point intermediate the top and bottom thereof, as indicated at 32. The plates 22, 26 and 24, 26 are secured together at the points of engagement, as by welding for example. To provide additional support, plates 34 extend within and fill the space between the plates 22, 24 and 26 at the top and bottom. The plates 34 may be welded or otherwise suitably joined to the plates 22, 24 and 26 to provide a rigid shield assembly.

The shield is mounted on the outside of the rear wall 18 of the truck cab as by bolts or any other suitable means, in the position shown, that is with the central rear edge 28 of the shield disposed in a vertical plane and with the mounting plate 26 disposed in a plane normal to the longitudinal axis of the vehicle. It will be noted that the upper end of the rear edge 28 projects rearwardly slightly farther than the lower end thereof. The lower end is thus shortened to clear the trailer. The trailer 12 is shown supporting a load of material 38 such as pipe which is lashed down as securely as possible by the front and rear members 40. In the event of sudden stopping, the load 38 or portions thereof, is apt to move forward relative to the vehicle if it has sufficient weight. This is a possibility when carrying heavy material even though all normal precautions have been taken, if the vehicle should stop suddenly. The driver, as well as the occupant seated beside the driver, is in an extremely hazardous position in the event of a forward shift in the load. The shield of my invention is designed to divert or deflect laterally outwardly any part of the load by engagement therewith should it shift toward the front. The shield extends from above the head of the driver and passenger to below the seat level and sufficiently to either side to deflect any forward shifting material clear of the driver and/or other occupant of the cab.

The particular shape of the shield is important. It will be noted that below the level of the points indicated at 32, the deflecting surfaces slant upwardly and forwardly, as well as laterally outwardly and forwardly. Therefore an object moving in a forward direction engaging the deflecting surfaces of the shield below the points 32 will be rolled or deflected outwardly and slightly upwardly and then downwardly as it moves beyond the shield. This is similar to the action of the prow of a boat as it cuts through the water. Even that portion of the material which engages the shield below but near the level of the points 32 will be rolled upwardly and the upward and rearward slope of the deflecting surfaces above the points 32 will constrain the material in a downward direction as it is deflected laterally outwardly. The material on the trailer will normally be disposed beneath the level indicated by the points 32 on the shield, but even where the material is piled above such level, the action of the shield is effective to deflect the material laterally outwardly and downwardly. The deflecting surfaces are concave both in vertical and horizontal planes to present a constantly changing angle to the deflected material at all times urging it progressively to either side as it shifts forwardly. The upward and forward slope of the deflecting surfaces below the level of the points 32 absorbs some of the forward energy of the material by the slight lifting action and rolling that it imparts to the material.

The shield of this invention is relatively inexpensive yet designed to completely safeguard the driver and/or other occupant of the cab from a hazard which is ever present in the transportation of heavy material.

What I claim as my invention is:

1. In a truck or like vehicle having a driver's cab portion and a load-carrying portion behind said driver's cab portion, a driver's protection shield rigidly mounted on the vehicle adjacent said driver's cab portion, said shield having a pair of generally upright rearwardly facing surfaces which meet in a central rear edge disposed in a vertical plane and flare laterally outwardly from said central rear edge in a forward direction to serve as deflectors for protecting the driver against the hazard of a formwardly shifting load, all horizontal sections through both surfaces being generally in the form of a V with the apex of the V located on said central rear edge and with each leg of the V concave throughout its length and curving laterally outwardly from said apex to its extremity at a substantially uniformly increasing angle with respect to a longitudinal center line through said apex, which angle is always less than 90°.

2. The structure defined in claim 1 wherein said cab portion is provided with a top extending over the head of a driver seated in said cab portion, said shield extends from the seat level of said cab portion to a level adjacent the top of said cab portion and sufficiently to either side to deflect any forwardly shifting material clear of the driver.

3. In a truck or like vehicle having a driver's cab portion and a load-carrying portion behind said driver's cab portion, a driver's protection shield rigidly mounted on the vehicle adjacent said driver's cab portion, said shield having a pair of generally upright rearwardly facing surfaces which meet in a central rear edge disposed in a vertical plane and flare laterally outwardly from said central rear edge in a forward direction to serve as deflectors for protecting the driver against the hazard of a forwardly shifting load, all horizontal sections through both surfaces being generally in the form of a V with the apex of the V located on said central rear edge and with each leg of the V concave throughout its length and curving laterally outwardly from said apex to its extremity at a substantially uniformly increasing angle with respect to a longitudinal center line through said apex, which angle is always less than 90°, the central rear edge as well as all vertical sections through said surfaces being concave, at least the upper portions of said central rear edge and said concave vertical sections curving from the upper edge forwardly and downwardly at a substantially uniformly increasing angle to the horizontal.

4. The structure defined in claim 3 wherein the lower portions of said central rear edge and said concave vertical sections curve from the lower edge forwardly and upwardly at a substantially uniformly increasing angle to the horizontal.

5. The structure defined in claim 4 wherein said surfaces are provided by deflector plates of sheet material, and means for rigidly supporting said deflector plates including a flat front plate extending from side to side and from top to bottom of said deflector plates, said front plate engaging and bracing the side edges of said deflector plates at the junction between the upper and lower portions aforesaid of the concave vertical sections of the surfaces of said deflector plates.

6. The structure defined in claim 5 wherein filler plates fill the space between said front plate and said deflector plates at the top and bottom thereof and are marginally secured thereto to provide additional reinforcement.

7. In a truck or like vehicle having a driver's cab portion and a load-carrying portion behind said driver's cab portion, a driver's protection shield rigidly mounted on the vehicle adjacent said driver's cab portion, said shield having a pair of generally upright rearwardly facing surfaces which meet in a central rear edge disposed in a vertical plane and flare laterally outwardly from said central rear edge in a forward direction to serve as deflectors for protecting the driver against the hazard of a forwardly shifting load, all horizontal sections through both surfaces being generally in the form of a V with the apex of the V located on said central rear edge.

References Cited in the file of this patent
UNITED STATES PATENTS

| Number | Name | Date |
|---|---|---|
| 71,552 | Thompson | Nov. 26, 1867 |
| 135,351 | McMullin | Jan. 28, 1873 |
| 429,082 | Carr | May 27, 1890 |
| 638,442 | Butterfield | Dec. 5, 1899 |
| 2,078,679 | Golphin | Apr. 27, 1937 |
| 2,373,398 | Hoobler | Apr. 10, 1945 |
| 2,490,532 | Maxon | Dec. 6, 1949 |
| 2,605,113 | Gilmore | July 29, 1952 |